United States Patent [19]

Weih et al.

[11] Patent Number: 5,200,459

[45] Date of Patent: Apr. 6, 1993

[54] STABLE BUTADIENE HETEROPOLYMER LATICES

[75] Inventors: Mark A. Weih, Cambridge Springs; Helmut W. Kucera, West Springfield, both of Pa.

[73] Assignee: Lord Corporation, Erie, Pa.

[21] Appl. No.: 708,973

[22] Filed: May 31, 1991

[51] Int. Cl.$^5$ .................. C08F 2/16; C08K 3/20; C08L 9/04
[52] U.S. Cl. .................. 524/459; 524/503; 524/761; 524/765; 524/766; 524/767
[58] Field of Search .......... 524/459, 503, 761, 767, 524/765, 766

[56] References Cited

U.S. PATENT DOCUMENTS

| | | | |
|---|---|---|---|
| 3,779,960 | 12/1973 | Araki et al. | 524/459 |
| 3,882,069 | 5/1975 | Banta | 260/29.7 SQ |
| 3,920,600 | 11/1975 | Ahramjian | 260/29.7 UA |
| 3,959,205 | 5/1976 | Kobayashi et al. | 524/459 |
| 4,128,514 | 12/1978 | Fitzgerald | 260/17 A |
| 4,141,875 | 2/1979 | Brizzolara et al. | 524/459 |
| 4,155,891 | 5/1979 | Pettelkau et al. | 260/23.7 A |
| 4,328,149 | 5/1982 | Morse et al. | 524/459 X |
| 4,380,600 | 4/1983 | Hosoda et al. | 524/459 X |
| 4,387,179 | 6/1983 | Sun | 524/459 X |
| 4,396,527 | 8/1983 | Matsuyama et al. | 524/459 X |
| 4,409,359 | 10/1983 | Tanimura et al. | 524/459 X |
| 4,608,139 | 8/1986 | Craun et al. | 204/181.7 |
| 4,617,343 | 10/1986 | Walker et al. | 524/459 X |
| 4,767,816 | 8/1988 | Iacoviello et al. | 524/459 |

FOREIGN PATENT DOCUMENTS 1166810 9/1968 United Kingdom .
1469993 5/1974 United Kingdom .

*Primary Examiner*—Joseph L. Schofer
*Assistant Examiner*—J. M. Reddick
*Attorney, Agent, or Firm*—W. Graham Buie

[57] ABSTRACT

A butadiene heteropolymer latex is prepared by emulsion polymerizing appropriate monomers in the presence of polyvinyl alcohol and a stabilizing solvent. The butadiene heteropolymer can be a butadiene copolymer or terpolymer prepared from butadiene monomers and comonomers such as α-haloacrylonitrile and acrylic acid. The butadiene heteropolymer latices can be prepared without problems of coagulation and can be utilized effectively in adhesive compositions without the use of volatile solvents. Adhesive bonds prepared from the butadiene heteropolymer latices also avoid the side effect problems associated with polymers prepared utilizing conventional surfactant-based emulsion polymerization techniques.

22 Claims, No Drawings

STABLE BUTADIENE HETEROPOLYMER LATICES

FIELD OF THE INVENTION

The present invention relates to latices of polymeric materials which are useful in various adhesive applications. More specifically, the present invention relates to stable latices of emulsion polymerized butadiene polymers which are useful in adhesive applications and which avoid the undesirable side effects associated with conventional surfactant-based latices.

BACKGROUND OF THE INVENTION

Along with the increasing concern for preserving the world environment comes a call from the adhesives industry for adhesive systems which avoid the use of highly volatile and environmentally detrimental solvents. One possible reply is the utilization of aqueous adhesive compositions wherein the polymeric materials contained therein are emulsion or otherwise polymerized in the presence of water. Traditional surfactants utilized in preparing emulsion-polymerized polymers include anionic and nonionic surfactants such as alkali alkyl sulfates, ethoxylated aryl sulfonic acid salts and ethoxylated alkyl aryl derivatives. A latex (polymer in water dispersion) prepared utilizing such traditional surfactants necessarily contains surfactant molecules in the latex. The presence of these surfactant molecules can have a deleterious effect (i.e., result in a "surfactant penalty") upon adhesive or other similar compositions containing the surfactants, especially when the compositions are exposed to high temperature or other severe environments. This surfactant penalty is particularly evident in adhesive compositions since the surfactant molecules directly interfere with the ability of the adhesive molecules to interact with a surface being bonded. Furthermore, emulsions prepared with conventional type surfactants are relatively unstable and will readily undergo coagulation in the presence of solvents or divalent ions which may be present as impurities. Conventional emulsions are also easily destroyed by freezing temperatures.

An aqueous emulsion polymerization process is disclosed in British Patent No. 1,166,810. The process involves the emulsion polymerization of chloroprene, alone or with copolymerizable comonomers, in an emulsifying composition which contains potassium salts of a rosin acid, a formaldehyde condensate of a naphthalene sulfonic acid and a polymerized unsaturated fatty acid. It has also previously been proposed to utilize polyvinyl alcohol in an emulsion polymerization process. For example, British Patent No. 1,469,993 describes the formation of polychloroprene latices by polymerizing an aqueous suspension of chloroprene monomers in the presence of polyvinyl alcohol and a dialkyl xanthogen disulfide or an alkyl mercaptan.

U.S. Pat. No. 3,920,600 describes a neoprene latex used in pressure sensitive adhesive coatings which contains an alkylated melamine-aldehyde resin, in combination with an aqueous dispersion of a copolymer prepared by polymerizing an aqueous suspension of chloroprene monomers and $\alpha,\beta$-unsaturated carboxylic acid monomers in the presence of polyvinyl alcohol and a dialkyl xanthogen disulfide or an alkyl mercaptan. U.S. Pat. No. 4,128,514 discloses a process for preparing latex compositions by polymerizing an aqueous suspension of chloroprene and $\alpha,\beta$-unsaturated carboxylic acid monomers in the presence of hydroxyalkyl cellulose, polyvinyl alcohol, and an alkyl mercaptan, or a dialkyl xanthogen disulfide.

A need exists for a latex composition which would exhibit substantial bonding activity with a minimal or non-existent surfactant penalty and which would exhibit stability in the presence of solvents, divalent ions, and freezing temperatures.

SUMMARY OF THE INVENTION

The present invention is a stable latex composition of a butadiene polymer which is useful in adhesive applications and which avoids the problems described above related to the use of conventional surfactant systems. The latex of the present invention is prepared by the emulsion polymerization of butadiene monomers or a combination of butadiene monomers and additional copolymerizable monomers in the presence of polyvinyl alcohol and a stabilizing solvent. More specifically, the latices of the present invention are prepared by initiating and maintaining free radical polymerization of the appropriate monomers in an aqueous suspension of polyvinyl alcohol and a stabilizing solvent. A butadiene homopolymer may be prepared by utilizing a butadiene monomer such as 2,3-dichloro-1,3-butadiene, or a copolymer or terpolymer of polybutadiene monomers may be produced by copolymerizing a combination of butadiene monomers or by copolymerizing one or more butadiene monomers with other copolymerizable monomers. Other copolymerizable monomers include $\alpha$-haloacrylonitrile, acrylic acid, methacrylic acid, and styrene sulfonic acid.

It has presently been discovered that the use of polyvinyl alcohol in combination with a stabilizing solvent during emulsion polymerization as disclosed herein significantly enhances the stability and thermal properties of the resulting latex. It is presently believed that the stabilizing solvent acts to enhance grafting between the polyvinyl alcohol and the butadiene polymer.

DETAILED DESCRIPTION OF THE INVENTION

The present invention involves the formation of a stable butadiene polymer latex by polymerizing appropriate monomers in an aqueous suspension of polyvinyl alcohol and a stabilizing solvent. The butadiene polymer of the present invention can be prepared from butadiene monomers alone or from a combination of butadiene monomers and other copolymerizable monomers described in more detail below. "Butadiene polymer," therefore, herein refers to butadiene homopolymers, butadiene copolymers, butadiene terpolymers and higher polymers. "Butadiene heterpolymer" herein refers to butadiene copolymers, butadiene terpolymers and higher polymers.

The butadiene monomers useful for preparing the butadiene polymer of the latex of the present invention can essentially be any monomer containing conjugated unsaturation. Typical monomers include 2,3-dichloro-1,3-butadiene; 1,3-butadiene; 2,3-dibromo-1,3-butadiene; isoprene; 2,3-dimethylbutadiene; chloroprene; bromoprene; 2,3-dibromo-1,3-butadiene; 1,1,2-trichlorobutadiene; cyanoprene; hexachlorobutadiene and combinations thereof. It is particularly preferred to use 2,3-dichloro-1,3-butadiene as the butadiene monomer of the present invention since butadiene homopolymers derived from 2,3-dichloro-1,3-butadiene or butadiene copolymers wherein a major portion of the polymer contains 2,3-dichloro-1,3-butadiene monomer units have been found to be particularly useful in adhesive applications due to the excellent bonding ability and barrier properties of the 2,3-dichloro-1,3-butadiene-based polymers.

"Copolymerizable monomers" herein refers to monomers which are capable of undergoing copolymerization with the butadiene monomers described above. Typical copolymerizable monomers useful in the present invention include α-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; styrene; styrene sulfonic acid; α-halostyrenes; chlorostyrene; α-methylstyrene; α-bromovinylketone; vinylidene chloride; vinyl toluenes; vinylnaphthalenes; vinyl ethers, esters, and ketones such as methyl vinyl ether, vinyl acetate, and methyl vinyl ketone; esters, amides, and nitriles of acrylic and methacrylic acids such as ethyl acrylate, methyl methacrylate, glycidyl acrylate, methacrylamide, and acrylonitrile; and combinations of such monomers.

The copolymerizable monomers, if utilized, are preferably α-halo-acrylonitrile and/or α,β-unsaturated carboxylic acid monomers. The copolymerizable monomers are utilized in an amount ranging from about 0.1 to 30, percent by weight of the total monomers utilized to form the butadiene polymer.

Two butadiene polymers which have been found to be particularly useful in adhesive applications include a butadiene copolymer prepared from butadiene monomers and α-halo-acrylonitrile monomers wherein the α-haloacrylonitrile monomers comprise from about 1 to 29, preferably about 5 to 20, percent by weight of the total monomers, and a butadiene terpolymer prepared from butadiene monomers, α-haloacrylonitrile monomers, and α,β-unsaturated carboxylic acid monomers, wherein the α-haloacrylonitrile monomers comprise from about 1 to 29, preferably about 5 to 20, percent by weight and the α,β-unsaturated carboxylic acid monomers comprise from about 0.1 to 10, preferably about 0.1 to 1, percent by weight of the total monomers utilized.

The polyvinyl alcohol (PVA) of the present invention can be any PVA, commercially or otherwise available, which will dissolve in the present aqueous polymerization system at the temperature of the polymerization. Such PVA will usually be the product of hydrolysis of polyvinyl acetate, wherein the degree of hydrolysis is preferably about 80-99 percent. The average degree of polymerization of the PVA will be about 350-2,500. For a general discussion of various PVAs, see The Encyclopedia of Polymer Science and Technology, Interscience Publishers, Vol. 14, pp. 149ff, (1971). The preferred proportion of PVA is about 3 to 12, preferably about 6 to 8, parts per 100 parts by weight of total monomers. The PVA acts as an emulsion stabilizer during the polymerization.

The stabilizing solvent useful for preparing the improved latices of the present invention which are useful in adhesive applications can essentially be any organic solvent capable of exhibiting miscibility with water. The solvent is preferably an organic alcohol such as methanol; ethanol; isopropanol; butanol; 2-(2-ethoxy ethoxy)ethanol; 2-(2-butoxy ethoxy)ethanol; 2-(2-methoxy ethoxy)-ethanol; 2-methoxy ethanol; 2-butoxy ethanol; 2-ethoxy ethanol; 2-butoxy propanol; 2-butoxy ethoxy propanol and the propoxy propanols; also useful are known glycols including ethylene and propylene glycols such as ethylene glycol monomethyl ether and propylene glycol monomethyl ether. Various combinations of the foregoing solvents may also be utilized. Preferred stabilizing solvents useful for the present invention include methanol, ethanol, isopropanol, butanol, ethylene glycol monomethyl ether, and propylene glycol monomethyl ether. The stabilizing solvent is typically utilized in an amount ranging from about 10 to 100, preferably from about 30 to 50, parts by weight per 100 parts by weight of total monomers. The stabilizing solvent is typically vacuum-stripped from the latex after the emulsion polymerization so as to avoid the presence of any volatile material in the final latex.

In carrying out the emulsion polymerization to produce the novel latex of the present invention, other optional ingredients may be employed during the polymerization process. For example, although not preferred for the reasons given above, conventional anionic and/or nonionic surfactants may optionally be utilized in order to aid in the formation of the latex. Typical anionic surfactants include carboxylates, such as fatty acid soaps from lauric, stearic, and oleic acid; acyl derivatives of sarcosine, such as methyl glycine; sulfates, such as sodium laurel sulfate; sulfated natural oils and esters, such as Turkey Red Oil; alkyl aryl polyether sulfates; alkali alkyl sulfates; ethoxylated aryl sulfonic acid salts; alkyl aryl polyether sulfonates; isopropyl naphthalene sulfonates; sulfosuccinates; phosphate esters, such as short chain fatty alcohol partial esters of complex phosphates; and orthophosphate esters of polyethoxylated fatty alcohols. Typical nonionic surfactants include ethoxylated (ethylene oxide) derivatives, such as ethoxylated alkyl aryl derivatives; mono- and polyhydric alcohols; ethylene oxide/propylene oxide block copolymers; esters, such as glyceryl monostearate; products of the dehydration of sorbitol, such as sorbitan monostearate and polyethylene oxide sorbitan monolaurate; amines; lauric acid; and isopropenyl halide. A conventional surfactant, if utilized, is employed in an amount ranging from about 0.01 to 15, preferably from about 0.1 to 5 parts by weight per 100 parts by weight of total monomer.

Chain transfer agents may also be employed during the emulsion polymerization of the present invention in order to control the molecular weight of the butadiene polymers and to modify the physical properties of the resultant polymers as is known in the art. Any of the conventional organic sulfur-containing chain transfer agents may be utilized such as alkyl mercaptans and dialkyl xanthogen disulfides. Typical alkyl mercaptans include dodecyl mercaptan, octyl mercaptan, tert-dodecyl mercaptan, tridecyl mercaptan, and mixtures of mercaptans derived from coconut oil (often called lauryl mercaptan), with dodecyl mercaptan being preferred.

The dialkyl xanthogen disulfides can be represented by the structure

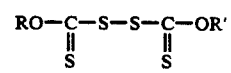

wherein R and R' independently are alkyl radicals having 1-8 carbon atoms. Examples of suitable alkyl radicals are methyl, ethyl, propyl, isopropyl, and the various isomeric butyl, amyl, hexyl, heptyl and octyl radicals. The preferred dialkyl xanthogen disulfides are those in which each alkyl radical has 1–4 carbon atoms, especially diisopropyl xanthogen disulfide.

A chain transfer agent, if utilized, is typically employed in an amount ranging from about 0.1 to 2, preferably from about 0.2 to 1, parts by weight per 100 parts by weight of total monomer.

The formation of the stable latices of the present invention is carried out by emulsion polymerizing the appropriate monomers in the presence of the polyvinyl alcohol and the stabilizing solvent. Specifically, an aqueous emulsification mixture of water, the polyvinyl alcohol and the stabilizing solvent, is formed to which is added the appropriate monomers. The emulsification mixture typically contains from about 40 to 80, preferably about 50 to 70, percent by weight of water.

The emulsion polymerization of the present invention is typically triggered by a free radical initiator. Typical free radical initiators useful in the present invention include conventional redox systems, peroxide systems, azo derivatives, and hydroperoxide systems. The use of a redox system is presently preferred for use in the invention and examples of such redox systems include ammonium persulfate/sodium metabisulfite, ferric sulfate/ascorbic acid/hydroperoxide and tributylborane/hydroperoxide. Presently, the most preferred redox system utilizes $(NH_4)_2S_2O_8$ (ammonium persulfate) and $Na_2S_2O_5$ (sodium metabisulfite). When utilizing this particular redox system, the $Na_2S_2O_5$ is utilized to prepare the emulsification mixture. The $(NH_4)_2S_2O_8$ is then added to the emulsification mixture along with the appropriate monomers to initiate polymerization. Both the $Na_2S_2O_5$ and the $(NH_4)_2S_2O_8$ are utilized in an amount ranging from about 0.1 to 3, preferably about 0.2 to 1, parts by weight per 100 parts by weight of total monomer.

The emulsion polymerization is typically carried out at a temperature in the range from about 30° to 90° C., preferably about 40° to 60° C. Monomer conversion typically ranges from about 70 to 100 percent, preferably from about 80 to 100 percent. The latices prepared according to the polymerization of the present invention typically have a solids content of between about 30 and 70 percent, more typically between about 40 and 60 percent; a viscosity of between about 50 and 10,000 centipoise, preferably between about 200 and 1,000 centipoise; and a particle size between about 100 and 300 nanometers. The butadiene polymer of the latex typically has a molecular weight of between about 3,000 and about 300,000, preferably between about 35,000 and 100,000 Mn.

The butadiene polymer latices of the present invention exhibit excellent stability, are capable of forming continuous films, possess good barrier properties, and minimize or eliminate the surfactant penalty associated with conventional latices. These characteristics mimic the characteristics of solvent-borne butadiene polymers and render the latices particularly useful for adhesive applications. The unusual stability of the latices to exposure to solvents, ionic contamination, and freezing temperatures is believed to be the result of the use of the polyvinyl alcohol in combination with the stabilizing solvent during the emulsion polymerization disclosed herein. The stabilizing solvent is believed to act as a bridge between the water-soluble polyvinyl alcohol and the organic monomers so as to promote grafting between the two which results in enhanced stabilization.

The butadiene polymer latices prepared in accordance with the present invention can be effectively employed as a polymeric material in adhesives, coatings, and the like. The latices of the present invention are preferably utilized in an aqueous adhesive system for bonding an elastomeric substrate to a metal surface. The butadiene latices have a particular affinity for elastomeric substrates, and when utilized in an adhesive system, should be applied at least in substantial contact with the elastomeric substrate. "At least in substantial contact" herein refers to at least minimum physical contact between the butadiene polymer latex and the elastomeric substrate.

The metal surface to which the elastomeric substrate may be bonded may have a conventional aqueous metal primer applied thereto. Typical aqueous primers include phenolic resin-based primers such as CHEMLOK 802 and CHEMLOK 810 produced by Lord Corporation. The butadiene polymer latex is typically applied directly to a metal surface or directly to any primer which has been applied to the metal so as to ensure contact between the latex and the elastomeric substrate which is brought into contact with the coated metal surface.

When utilizing the butadiene polymer latices of the present invention to bond an elastomeric substrate to a metal surface, it may be desirable to use conventional adhesion promoting additives or other materials in combination with the latex. For example, in some instances, it is desirable to utilize a nitroso compound in combination with the butadiene polymer latex. The nitroso compound can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The presently preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds, unless otherwise specified.

Particularly preferred nitroso compounds are characterized by the formula:

$$(R)_m-Ar-(NO)_2$$

wherein Ar is selected from the group consisting of phenylene and naphthalene; R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from 1 to 8 carbon atoms; and m is zero, 1, 2, 3, or 4, and preferably is zero.

A partial non-limiting listing of nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitrosobenzene. The nitroso compound is typically utilized in an amount from about 1 to about 25, preferably from about 5 to about 15 percent by weight of a butadiene polymer latex-based adhesive composition.

An adhesive composition based on the present butadiene polymer latices can optionally contain other well-known additives including plasticizers, fillers, pigments, reinforcing agents and the like, in amounts employed by those skilled in the adhesive arts to obtain a desired color and consistency.

In order to bond an elastomeric substrate to a metal surface, the surface of the metal and the elastomeric substrate are typically brought together under a pressure of from about 20.7 to 172.4 Mega Pascals (MPa), preferably from about 20 MPa to 50 MPa. The resulting elastomer-metal assembly is simultaneously heated to a temperature of from about 140° C. to about 200° C., preferably from about 150° C. to 170° C. The assembly should remain under the applied pressure and temperature for a period of from about 3 minutes to 60 minutes, depending on the cure rate and thickness of the elastomeric substrate. This process may be carried out by applying the elastomeric substrate as a semi-molten material to the metal surface as in, for example, an injection-molding process. The process may also be carried out by utilizing compression molding, transfer molding or autoclave curing techniques. After the process is complete, the bond is fully vulcanized and ready for use in a final application.

Although the latices of the present invention are preferred for bonding elastomeric materials to metal, the present latices may be applied as an adhesive, primer or coating to any surface or substrate capable of receiving the adhesive. The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, Buna-S, Buna-N, butyl rubber, brominated butyl rubber, nitrile rubber, and the like. The material may also be a thermoplastic elastomer such as the thermoplastic elastomers sold under the tradenames SANTOPRENE and ALCRYN by Monsanto and DuPont, respectively. The material is most preferably an elastomeric material such as natural rubber (cis-polyisoprene). The surface to which the material is bonded can be any surface capable of receiving the adhesive, such as a glass, plastic or fabric surface, and is preferably a metal surface selected from any of the common structural metals such as iron, steel (including stainless steel), lead, aluminum, copper, brass, bronze, Monel metal, nickel, zinc, and the like.

The butadiene latices of the present invention, when utilized as or in combination with, an aqueous adhesive composition, provide excellent adhesive bonds while avoiding the use of environmentally detrimental solvents. Furthermore, the present latices exhibit substantial stability with respect to exposure to organic solvents, ionic contaminants, and freezing temperatures.

The following examples are disclosed in order to further illustrate and fully disclose the invention and are not intended to limit in any manner the scope of the invention which is defined by the claims.

EXAMPLE 1

A dichlorobutadiene homopolymer latex is prepared from the following ingredients:

| Ingredient | Weight (g) | Parts per hundred parts of total monomer (PHM) |
|---|---|---|
| 2,3-dichloro-1,3-butadiene (90% in $CH_2Cl_2$) | 200.0 | 100.0 |
| Deionized water | 160.0 | 88.9 |
| Methanol | 148.2 | 82.3 |
| Polyvinyl alcohol[a] | 18.2 | 10.1 |
| $(NH_4)_2S_2O_8$ | 1.0 | 0.6 |
| $Na_2S_2O_5$ | 1.0 | 0.6 |

[a]The polyvinyl alcohol used here and in subsequent examples is AIRVOL 203 (Air Products and Chemicals, Inc.)

A 140 g portion of the water, the methanol, the polyvinyl alcohol, and the $Na_2S_2O_5$ are charged to a 1 L flask equipped with stirring, $N_2$, heat and a condenser. The resulting mixture is heated to a temperature of 50° C. after which the dichlorobutadiene monomer, and the $(NH_4)_2S_2O_8$ dissolved in the remaining water are added over a period of 1 hour, and the polymerization is continued for one additional hour. The resulting latex is then vacuum stripped at 80 mmHg and 50° C. to remove the methanol. This procedure results in a stable high solids latex having a solids content of 43.9 percent, a monomer conversion of 86.9 percent, an initial viscosity of 219 centipoise and a particle size of 262 nanometers.

EXAMPLE 2

A dichlorobutadiene homopolymer latex is prepared according to the procedure of Example 1 utilizing the following ingredients:

| Ingredient | Weight (g) | PHM |
|---|---|---|
| 2,3-dichloro-1,3-butadiene (90% in $CH_2Cl_2$) | 200.0 | 100.0 |
| Deionized water | 160.0 | 88.9 |
| Methanol | 40.0 | 22.2 |
| Polyvinyl alcohol | 20.0 | 11.1 |
| $(NH_4)_2S_2O_8$ | 1.1 | 0.6 |
| $Na_2S_2O_5$ | 1.1 | 0.6 |

The latex prepared above is then employed as an adhesive composition with and without 10% p-dinitrosobenzene. The latex is applied over grit-blasted steel coupons which have been coated with a phenolic resin-based aqueous primer (CHEMLOK 802, Lord Corporation). Natural rubber stock #E-218 (55–60 durometer Shore A semi-EV cure natural rubber) is utilized as the elastomeric material and is brought into contact with the adhesive-coated coupons at 153° C. for 15 minutes in order to prepare bonded parts according to test method ASTM D429-B.

The bonded parts are tested according to ASTM D429-B at 20"/min. modified to a 45° peel angle. The pounds (#) of force required to separate the elastomer from the metal and the percent rubber failure (% R) are recorded. A high percentage of rubber failure is desirable since this indicates that the bond is stronger than the elastomer itself.

The test resulted in 62#, 52% R (without p-dinitrosobenzene) and 73#, 95% R (with p-dinitrosobenzene) thereby indicating that an effective bond can be produced by utilizing the latices of the present invention.

Although not tested for bonding activity, additional stable latices are successfully prepared in accordance with the procedure and ingredients of Example 2 above with varying amounts of polyvinyl alcohol and methanol, to wit:

| Polyvinyl Alcohol | Methanol |
|---|---|
| 11.1 | 33.3 |
| 11.1 | 55.6 |
| 7.8 | 33.3 |
| 7.8 | 55.6 |
| 4.4 | 55.6 |

EXAMPLE 3

A dichlorobutadiene/α-bromoacrylonitrile copolymer latex is prepared with the following ingredients:

| Materials | Weight (g) | PHM |
|---|---|---|
| 2,3-dichloro-1,3-butadiene (90% in $CH_2Cl_2$) | 656.0 | 82.0 |
| α-bromoacrylonitrile | 144.0 | 18.0 |
| Polyvinyl alcohol | 56.0 | 7.0 |
| Deionized water | 1056.0 | 132.0 |
| Methanol | 400.0 | 50.0 |
| $(NH_4)_2S_2O_8$ | 4.0 | 0.5 |
| $Na_2S_2O_5$ | 4.0 | 0.5 |

The polyvinyl alcohol, methanol, $Na_2S_2O_5$ and 856 gms of water are added to a 3 L flask equipped with stirring, $N_2$, heat and a condenser. The mixture is heated to 50° C., after which the two monomers and the $(NH_4)_2S_2O_8$ dissolved in the remaining water are added over a 1 hour period. The resulting latex is vacuumed-stripped for 1 hour at 80 mmHg and 50° C. to remove the methanol.

The above procedure results in a stable latex having a monomer conversion of 95%, a solids content of 42.8% and a viscosity of 300 centipoise. As described below, the latex is tested for stability towards organic solvent, divalent ions, and freeze-thaw cycles.

Solvent Stability

Methanol solvent is added drop-wise to the latex. The amount of solvent required to cause the first coagulum, as well as the amount of solvent required to cause total coagulation, is recorded. 20 gm of the latex required 25 g of methanol to produce the first coagulum and 28 g of methanol to cause total coagulation.

Ionic Stability

A 20% $ZnCl_2$ aqueous solution is added drop-wise as above. 20 gm of the latex absorbed at least 35 g of solution without exhibiting any sign of coagulation.

Freeze-Thaw Stability

The latex is subjected to repetitive freeze-thaw cycles at −10° C. and the number of cycles required to cause coagulation are recorded. The latex withstood 4 cycles before the first coagulum appeared and total coagulation was still not complete after 5 cycles.

The above stability data is significant in that latices produced from conventional surfactants are typically very sensitive to exposure to minute amounts of organic solvents or ionic contaminants and will usually coagulate immediately upon freezing.

EXAMPLE 4

A series of latices (A-E) of terpolymers of 2,3-dichloro-1,3-butadiene; α-bromoacrylonitrile; and acrylic acid are prepared utilizing the following ingredients which are expressed as parts per hundred parts of 2,3-dichloro-1,3-butadiene:

| Ingredient | A | B | C | D | E |
|---|---|---|---|---|---|
| 2,3-dichloro-1,3-butadiene (90% in $CH_2Cl_2$) | 100 | 100 | 100 | 100 | 100 |
| α-bromoacrylonitrile | 0.5 | 1.9 | 5.3 | 8.6 | 10.0 |
| Acrylic acid | 2.5 | 0.7 | 2.5 | 0.7 | 2.5 |
| Polyvinyl alcohol | 7.0 | 4.9 | 4.0 | 4.9 | 7.0 |
| Deionized water | 90.0 | 90.0 | 90.0 | 90.0 | 90.0 |
| $(NH_4)_2S_2O_8$ | 0.5 | 0.5 | 0.5 | 0.5 | 0.5 |
| $Na_2S_2O_5$ | 0.5 | 0.5 | 0.5 | 0.5 | 0.5 |
| Methanol | 50.0 | 50.0 | 50.0 | 50.0 | 50.0 |

The latices are prepared according to the procedures set forth in Example 3 except that the acrylic acid monomer is added to the total monomer composition.

The latices prepared above are then tested for their ability to bond to a soft natural rubber stock, A060B (40–45 durometer Shore A natural rubber), according to the bonding procedure utilizing steel coupons as set forth in Example 2. The results of the bonding activity of the latices are set forth below in Table 2.

TABLE 2

| Latex | # Pull | % R |
|---|---|---|
| A | 9 | 0 |
| B | 16 | 25 |
| C | 53 | 93 |
| D | 61 | 78 |
| E | 48 | 99 |

EXAMPLE 5

A series of copolymer latices (F-S) of 2,3-dichloro-1,3-butadiene and α-bromoacrylonitrile are prepared according to the procedure of Example 3 utilizing the following ingredients which are expressed as PHM:

| Ingredient | F | G | H | I | J | K | L | M | N | O | P | Q | R | S |
|---|---|---|---|---|---|---|---|---|---|---|---|---|---|---|
| 2,3-Dichlorobutadiene-1,3 | 98 | 98 | 98 | 94 | 94 | 94 | 94 | 90 | 90 | 90 | 90 | 88 | 86 | 86 |
| α-Bromoacrylonitrile | 2 | 2 | 2 | 6 | 6 | 6 | 6 | 10 | 10 | 10 | 10 | 14 | 14 | 14 |
| Polyvinyl alcohol | 4 | 7 | 10 | 7 | 4 | 10 | 7 | 10 | 7 | 4 | 7 | 4 | 10 | 7 |
| Methanol | 50 | — | — | — | — | — | — | — | — | — | — | — | — | —> |
| $H_2O$ | 100 | — | — | — | — | — | — | — | — | — | — | — | — | —> |
| $(NH_4)_2S_2O_8$ | .5 | — | — | — | — | — | — | — | — | — | — | — | — | —> |

-continued

| Ingredient | F | G | H | I | J | K | L | M | N | O | P | Q | R | S |
|---|---|---|---|---|---|---|---|---|---|---|---|---|---|---|
| Na$_2$S$_2$O$_5$ | .5 | — | — | — | — | — | — | — | — | — | — | — | — | —> |

The physical properties of the latices are given below:

| Properties | Physical Properties of Latices | | | | | | | | | | | | | |
|---|---|---|---|---|---|---|---|---|---|---|---|---|---|---|
| | F | G | H | I | J | K | L | M | N | O | P | Q | R | S |
| Viscosity (cps) | 1988 | 65 | 311 | 205 | 717 | 495 | 222 | 322 | 104 | 173 | 133 | 225 | 510 | 75 |
| Total Solids Content | 35.2 | 37.0 | 41.3 | 40.9 | 39.9 | 41.5 | 41.9 | 40.8 | 39.3 | 40.8 | 40.6 | 40.3 | 41.0 | 39.1 |

The above latices are utilized to bond a natural rubber compound (Stock No. 46031, Delco Products of General Motors Corporation) to grit-blasted steel coupons coated with a phenolic resin-based aqueous primer (Primer #EP5874-59, Lord Corporation). The bonding procedure is identical to that disclosed in the above examples. The results of the bonding activity are set forth below in Table 3:

TABLE 3

| Latex | # Pull | % R |
|---|---|---|
| F | 45 | 43 |
| G | 30 | 18 |
| H | 21 | 6 |
| I | 41 | 61 |
| J | 46 | 65 |
| K | 50 | 92 |
| L | 45 | 93 |
| M | 45 | 90 |
| N | 45 | 62 |
| O | 47 | 93 |
| P | 46 | 67 |
| Q | 44 | 84 |
| R | 45 | 58 |
| S | 51 | 97 |

As can be seen from the above data, butadiene polymer latices prepared with polyvinyl alcohol and a stabilizing solvent in accordance with the present invention exhibit excellent stability and are useful as adhesives for bonding rubber to metal without the use of environmentally detrimental solvents and without the adverse side effects associated with conventional surfactants.

What is claimed is:

1. A butadiene heteropolymer latex prepared by an emulsion polymerization of a butadiene monomer and at least one copolymerizable monomer in the presence of polyvinyl alcohol and a stabilizing organic solvent wherein the stabilizing organic solvent is utilized in an amount ranging from about 10 to 100 parts by weight per 100 parts by weight of total monomers.

2. A latex according to claim 1 wherein the butadiene heteropolymer is a copolymer or a terpolymer prepared by polymerizing a butadiene monomer with at least one copolymerizable monomer.

3. A latex according to claim 2 wherein the butadiene monomer is selected from the group consisting of 2,3-dichloro-1,3-butadiene; 1,3-butadiene; 2,3-dibromo-1,3-butadiene; isoprene; 2,3-dimethylbutadiene; chloroprene; bromoprene; 1,1,2-trichlorobutadiene; cyanoprene; and hexachlorobutadiene.

4. A latex according to claim 3 wherein the butadiene monomer is 2,3-dichloro-1,3-butadiene.

5. A latex according to claim 2 wherein the copolymerizable monomer is selected from the group consisting of a α-haloacrylonitriles; α,β-unsaturated carboxylic acids; alkyl-2-haloacrylates; α-halostyrenes; vinyl toluenes; vinyl naphthalene; vinyl ethers, vinyl esters, and vinyl ketones; esters, amides, and nitriles of acrylic and methacrylic acids; and combinations thereof.

6. A latex according to claim 2 wherein the copolymerizable monomer is selected from the group consisting of α-bromoacrylonitrile, α-chloroacrylonitrile, acrylic acid, methacrylic acid, 2-ethylacrylic acid, 2-propylacrylic acid, 2-butylacrylic acid, itaconic acid, ethyl-2-chloroacrylate, ethyl-2-bromoacrylate, styrene, styrene sulfonic acid, α-methylstyrene, αbromovinyl ketone, vinylidene chloride, methyl vinyl ether, vinyl acetate, methyl vinyl ketone, ethyl acrylate, methyl methacrylate, glycidyl acrylate, methacrylamide, acrylonitrile, and chlorostyrene.

7. A latex according to claim 6 wherein the copolymerizable monomer is α-bromoacrylonitrile, α-chloroacrylonitrile, acrylic acid or methacrylic acid.

8. A latex according to claim 2 wherein the butadiene heteropolymer is a copolymer of 2,3-dichloro-1,3-butadiene and a copolymerizable monomer selected from the group consisting of α-bromoacrylonitrile and α-chloroacrylonitrile.

9. A latex according to claim 8 wherein the copolymer comprises from about 99 to percent by weight 2,3-dichloro-1,3-butadiene and from about 1 to 29 percent by weight copolymerizable monomer.

10. A latex according to claim 9 wherein the copolymerizable monomer is present in an amount from about 5 to 20 percent by weight.

11. A latex according to claim 2 wherein the butadiene heteropolymer is a terpolymer of 2,3-dichloro-1,3-butadiene, a first copolymerizable monomer selected from the group consisting of α-bromoacrylonitrile and α-chloroacrylonitrile, and a second copolymerizable monomer selected from the group consisting of acrylic and methacrylic acid.

12. A latex according to claim 11 wherein the terpolymer comprises from about 98.9 to 61 percent by weight 2,3-dichloro-1,3-butadiene, from about 1 to 29 percent by weight first copolymerizable monomer, and from about 0.1 to about 10 percent by weight second copolymerizable monomer.

13. A latex according to claim 12 wherein the first copolymerizable monomer is present in an amount from about 5 to 20 percent by weight and the second copolymerizable monomer is present in an amount from about 0.1 to 1 percent by weight.

14. A latex according to claim 1 wherein the solvent is an organic alcohol solvent.

15. A latex according to claim 14 wherein the solvent is selected from the group consisting of methanol, ethanol, isopropanol, butanol, ethylene glycol monomethyl ether, and propylene glycol monomethyl ether.

16. A latex according to claim 1 wherein the emulsion polymerization is initiated by a redox initiator selected from the group consisting of ammonium persulfate/sodium metabisulfite, ferric sulfate/ascorbic acid/hydroperoxide and tributylborane/hydroperoxide.

17. A latex according to claim 16 wherein the redox initiator is ammonium persulfate/sodium metabisulfite.

18. A method for preparing a butadiene heteropolymer latex comprising the steps of:
   forming an emulsification mixture of water, polyvinyl alcohol, and a stabilizing organic solvent wherein the stabilizing organic solvent is utilized in an amount ranging from about 10 to 100 parts by weight per 100 parts by weight of total monomers;
   adding to said mixture a butadiene monomer and at least one copolymerizable monomer; and
   initiating polymerization of the monomers in said mixture.

19. A method according to claim 18 wherein the emulsification mixture contains about 3 to 12 parts by weight polyvinyl alcohol per 100 parts by weight of total monomers utilized, and wherein the emulsification mixture contains from about 40 to 80 percent by weight of water.

20. A method according to claim 19 wherein the polyvinyl alcohol is presented in an amount from about 6 to 8 parts by weight, the solvent is present in an amount from about 30 to 50 parts by weight and the water is present in an amount from about 50 to 70 percent by weight.

21. A method according to claim 18 wherein the monomers are selected from the group consisting of α-bromoacrylonitrile, α-chloroacrylonitrile, acrylic acid and methacrylic acid, and the solvent is an organic alcohol solvent selected from the group consisting of methanol, ethanol, isopropanol, butanol ethylene glycol monomethyl ether, and propylene glycol monomethyl ether.

22. A latex according to claim 1 wherein the stabilizing organic solvent is utilized in an amount ranging from about 30 to 50 parts by weight.

* * * * *